United States Patent
Ji et al.

(10) Patent No.: US 9,838,939 B2
(45) Date of Patent: Dec. 5, 2017

(54) SERVICE TRANSFER METHOD AND APPARATUS

(71) Applicant: Huawei Technologies Co., Ltd., Shenzhen (CN)

(72) Inventors: Li Ji, Shanghai (CN); Hongzhuo Zhang, Shanghai (CN); Huan Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/220,716

(22) Filed: Jul. 27, 2016

(65) Prior Publication Data

US 2016/0337932 A1    Nov. 17, 2016

Related U.S. Application Data

(63) Continuation of application No. PCT/CN2014/071680, filed on Jan. 28, 2014.

(51) Int. Cl.
*H04W 36/00* (2009.01)
*H04W 36/38* (2009.01)
(Continued)

(52) U.S. Cl.
CPC ....... *H04W 36/38* (2013.01); *H04W 36/0066* (2013.01); *H04W 36/14* (2013.01); *H04W 48/20* (2013.01); *H04W 88/06* (2013.01)

(58) Field of Classification Search
CPC . H04W 36/38; H04W 36/0066; H04W 36/14; H04W 48/20; H04W 88/06
(Continued)

(56) References Cited

U.S. PATENT DOCUMENTS

2007/0224988 A1* 9/2007 Shaheen ........... H04W 36/0061
455/436
2015/0023341 A1    1/2015 Zhao et al.
(Continued)

FOREIGN PATENT DOCUMENTS

CN    102378380 A    3/2012
CN    102647771 A    8/2012
(Continued)

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.0.0, Dec. 2013, Technical Specification, 208 pages.
(Continued)

*Primary Examiner* — Khai M Nguyen
(74) *Attorney, Agent, or Firm* — Slater Matsil, LLP (57) ABSTRACT

A service transfer method and apparatus, and a service transfer processing method and apparatus relate to the field of mobile communications, are applied to a service transfer technology, and can improve utilization of network system resources. The method comprises: acquiring, by a UE, first information that is used to instruct the UE to perform service transfer to a wireless local area network (WLAN) access point; performing service transfer according to the first information; and sending a service transfer result to a 3rd Generation Partnership Project (3GPP) access point that serves the UE.

17 Claims, 4 Drawing Sheets

(51) Int. Cl.
*H04W 48/20* (2009.01)
*H04W 36/14* (2009.01)
*H04W 88/06* (2009.01)

(58) Field of Classification Search
USPC .......................................... 455/438, 436, 437
See application file for complete search history.

(56) References Cited

U.S. PATENT DOCUMENTS

| | | | | |
|---|---|---|---|---|
| 2015/0078360 | A1* | 3/2015 | Wang | H04W 48/18 370/338 |
| 2015/0146702 | A1* | 5/2015 | He | H04W 48/20 370/338 |
| 2015/0181470 | A1* | 6/2015 | Chai | H04W 36/0005 455/438 |
| 2017/0026824 | A1* | 1/2017 | Kim | H04W 8/08 |
| 2017/0070923 | A1* | 3/2017 | Li | H04W 36/0066 |

FOREIGN PATENT DOCUMENTS

| | | |
|---|---|---|
| CN | 103391632 A | 11/2013 |
| CN | 103391633 A | 11/2013 |
| EP | 1895799 A1 | 3/2008 |
| EP | 2408232 A1 | 1/2012 |
| WO | 2010132194 A1 | 11/2010 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 12)," 3GPP TS 36.331 V12.0.0, Dec. 2013, Technical Specification, 349 pages.

* cited by examiner

SERVICE TRANSFER METHOD AND APPARATUS

CROSS-REFERENCE TO RELATED APPLICATIONS

This application is a continuation of International Application No. PCT/CN2014/071680, filed on Jan. 28, 2014, which is hereby incorporated by reference in its entirety.

TECHNICAL FIELD

Embodiments of the present invention relates to the field of mobile communications, and in particular, to a service transfer method and apparatus, and a service transfer processing method and apparatus.

BACKGROUND

To meet requirements of a user for a high data transmission rate, user equipment (UE) may access a 3rd Generation Partnership Project (3GPP) network and a non-3GPP network at the same time. The non-3GPP network includes a wireless local area network (WLAN), Worldwide Interoperability for Microwave Access (WiMax), and the like. Previously, when performing service transfer, a UE selects by itself a WLAN access point (AP) as a target access point for service transfer, and therefore, multiple UEs may choose to access a same WLAN access point in a crowded place such as an airport departure lounge or a shopping mall. As a result, the WLAN access point is overloaded soon, and service quality of the WLAN access point deteriorates soon.

To resolve the foregoing problem, in a solution provided in the prior art, a UE fails to select a WLAN access point by itself, but a 3GPP network side directly assists or controls the UE to select the WLAN access point. The 3GPP network side may obtain information about multiple WLAN access points, and therefore, that the 3GPP network side assists or controls a terminal to select a WLAN access point can improve service transfer efficiency of the terminal.

However, in the foregoing solution of the prior art, a policy used by the 3GPP network side to assist or control the UE to select a WLAN access point may be inappropriate, or the UE selects a WLAN access point according to another policy but not a policy sent by the 3GPP network side, which results in a waste of system resources of a 3GPP network. In addition, currently, the 3GPP network side does not know whether the UE selects a proper WLAN and cannot optimize assistance information.

SUMMARY

Embodiments of the present invention provides a service transfer method and apparatus, and a service transfer processing method and apparatus, and can improve utilization of system resources of a 3GPP network.

To achieve the foregoing objective, the following technical solutions are used in embodiments of the present invention:

According to a first aspect, a service transfer apparatus is provided, including: an acquiring unit configured to acquire first information that is used to instruct the apparatus to perform service transfer to a wireless local area network WLAN access point. A processing unit is configured to perform service transfer according to the first information acquired by the acquiring unit. A sending unit is configured to send a service transfer result to a 3rd Generation Partnership Project 3GPP access point that serves the apparatus.

With reference to the first aspect, in a first possible implementation manner of the first aspect, the first information is information that is sent by a 3GPP network and that is used to instruct the apparatus to perform service transfer to a WLAN access point; or the first information is information that is sent by a 3GPP network and that is used to instruct the apparatus to perform service transfer to a WLAN access point, and a preference setting of the apparatus.

With reference to the first aspect or the first possible implementation manner of the first aspect, in a second possible implementation manner of the first aspect, the service transfer result includes service transfer succeeds or service transfer fails.

With reference to the second possible implementation manner of the first aspect, in a third possible implementation manner of the first aspect, when service transfer succeeds, the service transfer result further includes: an identity of a target WLAN access point that is selected by the processing unit, or service information of a service that is transferred to the target WLAN access point; and signal quality of the 3GPP access point and signal quality of the target WLAN access point when the processing unit selects the target WLAN access point.

With reference to the second possible implementation manner of the first aspect, in a fourth possible implementation manner of the first aspect, when service transfer fails, the service transfer result further includes a cause of service transfer failure.

With reference to the fourth possible implementation manner of the first aspect, in a fifth possible implementation manner of the first aspect, the cause of service transfer failure includes that the processing unit fails to select the target WLAN access point, that load of the target WLAN access point is higher than a preset value, that channel contention fails when the target WLAN access point is being accessed, that backhaul load of the target WLAN access point is higher than a preset value, that a service port is disabled when the processing unit performs service transfer, and that signal quality of the 3GPP access point is higher than a preset threshold.

With reference to the fourth possible implementation manner of the first aspect, in a sixth possible implementation manner of the first aspect, the service transfer result further includes: signal quality of the 3GPP access point and signal quality of the target WLAN access point when selecting the target WLAN by the processing unit times out.

With reference to any one of the second to the sixth possible implementation manners of the first aspect, in a seventh possible implementation manner of the first aspect, the service transfer result further includes a service transfer policy, where: when the first information is the information that is sent by the 3GPP network and that is used to instruct the apparatus to perform service transfer to a WLAN access point, the service transfer policy is: performing service transfer according to the first information. Alternatively, when the first information is the information that is sent by the 3GPP network and that is used to instruct the apparatus to perform service transfer to a wireless local area network WLAN access point, and the preference setting of the apparatus, the service transfer policy is: performing, by the apparatus, service transfer according to either the information that is sent by the 3GPP network and that is used to instruct the apparatus to perform service transfer to a wireless local area network WLAN access point, or the preference setting of the apparatus.

With reference to the first aspect or any one of the first to the seventh possible implementation manners of the first aspect, in an eighth possible implementation manner of the first aspect, the acquiring unit is further configured to receive a time threshold that is of service transfer and sent by the 3GPP access point, where the time threshold is used by the apparatus to determine whether service transfer succeeds or service transfer fails.

With reference to the first aspect or any one of the first to the eighth possible implementation manners of the first aspect, in a ninth possible implementation manner of the first aspect, the acquiring unit is further configured to: receive second information sent by the 3GPP access point, where the second information is used to instruct the apparatus to record the service transfer result; or acquire second information preset in the apparatus.

According to a second aspect, a service transfer method is provided, including: acquiring, by user equipment UE, first information that is used to instruct the UE to perform service transfer to a wireless local area network WLAN access point; and performing, by the UE, service transfer according to the first information, and sending a service transfer result to a 3rd Generation Partnership Project 3GPP access point that serves the UE.

With reference to the second aspect, in a first possible implementation manner of the second aspect, the first information is information that is sent by a 3GPP network and that is used to instruct the UE to perform service transfer to a WLAN access point; or the first information is information that is sent by a 3GPP network and that is used to instruct the UE to perform service transfer to a WLAN access point, and a preference setting of the UE.

With reference to the second aspect or the first possible implementation manner of the second aspect, in a second possible implementation manner of the second aspect, the service transfer result includes service transfer succeeds or service transfer fails.

With reference to the second possible implementation manner of the second aspect, in a third possible implementation manner of the second aspect, when service transfer succeeds, the service transfer result further includes: an identity of a target WLAN access point that is selected by the UE, or service information of a service that is transferred to the target WLAN access point; and signal quality of the 3GPP access point and signal quality of the target WLAN access point when the UE selects the target WLAN access point.

With reference to the second possible implementation manner of the second aspect, in a fourth possible implementation manner of the second aspect, when service transfer fails, the service transfer result further includes a cause of service transfer failure.

With reference to the fourth possible implementation manner of the second aspect, in a fifth possible implementation manner of the second aspect, the cause of service transfer failure includes that the UE fails to select the target WLAN access point, that load of the target WLAN access point is higher than a preset value, that channel contention fails when the target WLAN access point is being accessed, that backhaul load of the target WLAN access point is higher than a preset value, that a service port is disabled when the UE performs service transfer, and that signal quality of the 3GPP access point is higher than a preset threshold.

With reference to the fourth possible implementation manner of the second aspect, in a sixth possible implementation manner of the second aspect, the service transfer result further includes: signal quality of the 3GPP access point and signal quality of the target WLAN access point when selecting the target WLAN by the UE times out.

With reference to any one of the second to the sixth possible implementation manners of the second aspect, in a seventh possible implementation manner of the second aspect, the service transfer result further includes a service transfer policy, where when the first information is the information that is sent by the 3GPP network and that is used to instruct the UE to perform service transfer to a WLAN access point, the service transfer policy is: performing service transfer according to the first information. Alternatively, when the first information is the information that is sent by the 3GPP network and that is used to instruct the UE to perform service transfer to a wireless local area network WLAN access point, and the preference setting of the UE, the service transfer policy is: performing, by the UE, service transfer according to either the information that is sent by the 3GPP network and that is used to instruct the UE to perform service transfer to a wireless local area network WLAN access point, or the preference setting of the UE.

With reference to the second aspect or any one of the first to the seventh possible implementation manners of the second aspect, in an eighth possible implementation manner of the second aspect, the method further includes receiving, by the UE, a time threshold that is of service transfer and sent by the 3GPP access point, where the time threshold is used by the UE to determine whether service transfer succeeds or service transfer fails.

With reference to the second aspect or any one of the first to the eighth possible implementation manners of the second aspect, in a ninth possible implementation manner of the second aspect, the method further includes receiving, by the UE, second information sent by the 3GPP access point, where the second information is used to instruct the UE to record the service transfer result; or acquiring, by the UE, second information preset in the UE.

According to a third aspect, a service transfer processing apparatus is provided, including a receiving unit configured to receive a result of service transfer performed by user equipment UE to a wireless local area network WLAN access point. A processing unit is configured to process the service transfer result.

With reference to the third aspect, in a first possible implementation manner of the third aspect, the service transfer result is that service transfer succeeds or service transfer fails.

With reference to the third aspect or the first possible implementation manner of the third aspect, in a second possible implementation manner of the third aspect, when service transfer fails, the service transfer result further includes a cause of service transfer failure.

With reference to the second possible implementation manner of the third aspect, in a third possible implementation manner of the third aspect, the processing unit is specifically configured to: when the failure cause is that the UE fails to select the target WLAN access point, stop selecting the UE to perform service transfer; or when the failure cause is that load of the target WLAN access point is higher than a preset value, that channel contention fails when the target WLAN access point is being accessed, that backhaul load of the target WLAN access point is higher than a preset value, or that a service port is disabled when the UE performs service transfer, stop selecting the target WLAN access point as a WLAN access point to which the UE performs service transfer; or when the failure cause is that signal quality of the 3GPP access point is higher than a preset threshold, increase the preset threshold.

According to a fourth aspect, a service transfer processing method is provided, including: receiving, by a 3rd Generation Partnership Project 3GPP access point, a result of service transfer performed by user equipment UE to a wireless local area network WLAN access point, where the 3GPP access point serves the UE; and processing, by the 3GPP access point, the service transfer result.

With reference to the fourth aspect, in a first possible implementation manner of the fourth aspect, the service transfer result is that service transfer succeeds or service transfer fails.

With reference to the fourth aspect or the first possible implementation manner of the fourth aspect, in a second possible implementation manner of the fourth aspect, when service transfer fails, the service transfer result further includes a cause of service transfer failure.

With reference to the second possible implementation manner of the fourth aspect, in a third possible implementation manner of the fourth aspect, the processing, by the 3GPP access point, the service transfer result includes when the failure cause is that the UE fails to select the target WLAN access point, stopping, by the 3GPP access point, selecting the UE to perform service transfer; or when the failure cause is that load of the target WLAN access point is higher than a preset value, that channel contention fails when the target WLAN access point is being accessed, that backhaul load of the target WLAN access point is higher than a preset value, or that a service port is disabled when the UE performs service transfer, stopping, by the 3GPP access point, selecting the target WLAN access point as a WLAN access point to which the UE performs service transfer; or when the failure cause is that signal quality of the 3GPP access point is higher than a preset threshold, increasing, by the 3GPP access point, the preset threshold.

It may be learned from the above that in the prior art, a policy used by a 3GPP network side to assist or control a UE to select a non-3GPP access point (including a WLAN access point) is inappropriate, or a UE fails to select a WLAN access point according to a policy sent by a 3GPP network side but selects a non-3GPP access point according to another policy, which results in a waste of network system resources. According to the service transfer method and apparatus provided by the present invention, a UE can report a service transfer result to a 3GPP access point, and the service transfer result helps the 3GPP access point optimize first information that is used to instruct the UE to perform service transfer to a WLAN access point. It is more applicable to use the optimized first information to instruct the UE to perform service transfer to a WLAN access point, and therefore, an effect of improving utilization of network system resources can be achieved.

DETAILED DESCRIPTION OF ILLUSTRATIVE EMBODIMENTS

The following clearly describes the technical solutions in the embodiments of the present invention with reference to the accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

The technical solutions provided in the embodiments of the present invention may be applied to a scenario in which a UE performs service transfer from a 3GPP network or a WLAN to another WLAN, that is, the UE transfers some or all services of a 3GPP access point or of a WLAN access point to another WLAN access point. In addition, a WLAN access point from which a service is transferred may be referred to as a source WLAN access point, or a 3GPP access point from which a service is transferred is referred to as a source 3GPP access point, and a WLAN access point to which a service is transferred may be referred to as a target WLAN access point.

In the embodiments of the present invention, a 3GPP network access point may be an access node such as a base station (BS), a NodeB, or an evolved NodeB (eNB). A UE may be a cellular phone, a personal digital assistant (PDA), a wireless modem, a handheld device, a laptop computer, a cordless phone, or the like.

Figure 1:
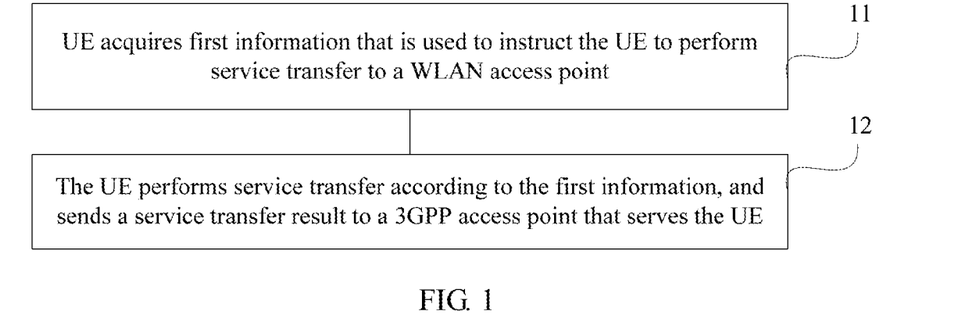
FIG. 1 is a flowchart of a service transfer method according to a first embodiment of the present invention.

FIG. 1 is a flowchart of a service transfer method according to a first embodiment of the present invention. The method provided in this embodiment of the present invention may be implemented by a UE that has a wireless communication capability. Service transfer may include at least two phases. A first phase is that the UE selects a target WLAN, and a second phase is that the UE transfers some services or all services to the WLAN selected in the first phase. As shown in FIG. 1, the service transfer method provided in the first embodiment of the present invention includes:

Step 11: The UE acquires first information that is used to instruct the UE to perform service transfer to a WLAN access point.

In this embodiment of the present invention, the UE has accessed a 3GPP access point, where the 3GPP access point provides a service for the UE. In addition, the UE may further access the 3GPP access point and a WLAN access point at the same time. If the 3GPP access point that the UE accesses or the WLAN access point that the UE accesses cannot meet a communication quality requirement and the like of the UE, to meet requirements of a user for a high data transmission rate, the UE may need to transfer some or even all communication services from the 3GPP access point that the UE accesses or the WLAN access point that the UE accesses to another WLAN access point, that is, perform service transfer (which may also be referred to as load transfer).

In step 11, to perform service transfer, the UE may acquire the first information, where the first information is used to instruct the UE to perform service transfer to a WLAN access point, which includes instructing the UE to select one WLAN access point and to transfer a service to this WLAN access point selected by the UE. The UE may acquire the first information from a 3GPP network side; or the UE may acquire, from a 3GPP network side, information that is used to instruct the UE to perform service transfer to a WLAN access point, and determine the first information with reference to preference setting (user preference) of the UE. The 3GPP network side includes a 3GPP access point, or includes both a 3GPP access point and an access network discovery and selection function (ANDSF) server.

Specifically, the first information may be determined by three types of information: type A, type B, and type C.

Type A: Information that is sent by a 3GPP access point and used to instruct the UE to perform service transfer to a WLAN access point. A service transfer parameter includes, for example, a signal quality threshold of the 3GPP access point and a signal quality threshold of the WLAN access point. Type A may be any one of type A1, type A2, and type A3. Type A1 is a signal quality threshold of a 3GPP access point; type A2 is a signal quality threshold of a 3GPP access point and a signal quality threshold of a WLAN access point; and type A3 is a WLAN identity list, where the list designates one or more WLAN access points to which the UE can perform service transfer. The UE may select one WLAN access point from the one or more WLAN access points as a target WLAN access point for service transfer.

Type B: Information that is sent by an ANDSF server and used to instruct the UE to perform service transfer to a WLAN access point, where the information may include network selecting information, such as priority information of different WLANs. The ANDSF server is located in a core network, and a function of the ANDSF server is to provide connection-related access information for a UE of a 3GPP network and a non-3GPP network (such as a WLAN), so as to help the UE discover radio access networks (including a 3GPP network and a WLAN) nearby the UE; and to provide a priority ranking of accessing the radio access networks, and manage connection rules of the radio access networks.

Type C: Preference setting of the UE. The preference setting of the UE is used by the UE to select a 3GPP network or a WLAN according to a preference of the UE (for example, an instruction generated by a manual operation).

The first information may specifically include the type A information, or include both the type A information and the type B information, or include both the type A information and the type C information, or include all the type A information, the type B information, and the type C information.

If service transfer is required, the UE may further acquire second information, where the second information is used to instruct the UE to record a service transfer result. The second information may be specifically used to configure the UE to record which service transfer results. The UE may acquire the second information after acquiring the first information, may acquire the first information after acquiring the second information, or may acquire the first information and the second information at the same time (for example, receive at the same time the first information and the second information that are sent by the 3GPP access point). The UE may acquire the second information in at least the following two manners:

Manner 1: The UE acquires second information preset in the UE.

In manner 1, information that the UE acquires when service transfer occurs may be preconfigured in the UE, and the UE determines, by invoking the second information stored in the UE, which service transfer results need to be recorded.

Manner 2: The UE receives the second information sent by the 3GPP access point.

In manner 2, the UE may determine, by using the received second information sent by the 3GPP access point, to record which service transfer results. The 3GPP access point may add the second information to a radio connection control connection reconfiguration (RCC reconfiguration for short) message and send the radio connection control connection reconfiguration message to the UE.

Specifically, the second information may be used to instruct the UE to report the service transfer result, for example, report a service transfer success or a service transfer failure, and may further report information corresponding to the service transfer success or failure. The information corresponding to the service transfer success or failure is specifically described in the following.

Step 12: The UE performs service transfer according to the first information, and sends a service transfer result to a 3GPP access point that serves the UE.

After acquiring the first information, the UE needs to determine, according to the first information, a target WLAN access point that can receive a communication service. In addition, the UE may further determine, according to the first information, a type, a quantity, and the like of a communication service that is to be transferred, or the UE may determine, in a manner of the prior art, a type, a quantity, and the like of a communication service that is to be transferred. It may be learned in step 11 that the first information has various types. The following briefly describes, by using four types therein as examples, how the UE determines the WLAN access point.

Manner 1: The first information is the type A2 information. The UE determines, according to the signal quality threshold of the 3GPP access point, whether service transfer needs to be performed. For example, if signal quality of a current accessed 3GPP access point is lower than the signal quality threshold of the 3GPP access point, the UE determines that a service needs to be transferred from the access point currently accessed; and further, if the UE detects a WLAN access point of which signal quality is higher than the signal quality threshold of the WLAN access point, the UE may select the WLAN access point as a target WLAN access point and then perform service transfer.

Manner 2: The first information is the type A3 information. The UE determines a range of target WLAN access points according to the WLAN identity list, and performs searching among the WLAN access points. In the manner, the UE may perform selecting in a range of WLAN access points, that is, the 3GPP access point may obtain a range of WLAN access points by screening WLAN access points that the UE is possible to access, so that the UE may not need to search all WLAN access points.

Manner 3: The first information is the type A2 information and the type B information. The UE may determine one (or more) candidate WLAN access point according to the type A2 information, and may further determine another (or multiple) candidate WLAN access point according to the type B information, and the UE may select, from the candidate WLAN access points, a target WLAN access point for service transfer. For example, if a same candidate WLAN access point is determined according to the type A2 information and according to the type B information, the UE uses the same candidate WLAN access point as a target WLAN access point for service transfer. If the candidate WLAN access points determined according to the type A2 information and according to the type B information are different, the UE may select, as a target WLAN access point for service transfer, the candidate WLAN access point determined according to one type of the information.

Manner 4: The first information is the type A2 information, the type B information, and the type C information. For example, if candidate target WLAN access points determined according to the foregoing three types of information are different, and the type C information has a highest priority, the UE preferentially determines, according to the type C information, a target WLAN access point for service transfer.

After determining a target WLAN access point for service transfer, the UE performs service transfer to the target WLAN access point, and the UE acquires, according to the second information, a result of service transfer performed by the UE, that is, acquires, according to the second information, information that needs to be reported to the 3GPP access point that serves the UE. An acquiring manner is corresponding to a type of the service transfer result, for example, may be directly determined or may be determined by means of measurement. After acquiring the service transfer result, the UE sends the service transfer result to the 3GPP access point that serves the UE. For example, the UE may report the service transfer result to the 3GPP access point by using an RRC message.

Specifically, the service transfer result may include that service transfer succeeds or service transfer fails.

In addition, when service transfer succeeds, the service transfer result further includes at least one of the following information: an identity of a target WLAN access point that is selected by the UE, service information of a service that is transferred to the target WLAN access point, and signal quality of the 3GPP access point and signal quality of the target WLAN access point when the UE selects the target WLAN access point.

The service information of the service that is transferred to the target WLAN access point may include at least one of the following information: a service type of the transferred service, such as voice, a video, and a service that uses the File Transfer Protocol (FTP); a name of the transferred service; a source access point name (APN) to which the transferred service belongs; an Internet Protocol (IP) stream to which the transferred service belongs; a bearer to which the transferred service belongs; and the like.

When service transfer fails, the service transfer result may further include a cause of service transfer failure.

The cause of service transfer failure may include that the UE fails to select a target WLAN access point, that load of the target WLAN access point is higher than a preset value, that channel contention fails when the target WLAN access point is being accessed, that backhaul load of the target WLAN access point is higher than a preset value, that a service port is disabled when the UE performs service transfer, and that signal quality of the 3GPP access point is higher than a preset threshold. The preset value and the preset threshold may be set as required.

In addition, before the UE performs service transfer, the UE may configure a service transfer timer to determine whether service transfer succeeds. The service transfer timer is used to determine whether an entire process in which the UE determines a target WLAN and transfers some services or all services to the target WLAN times out; and further whether the UE succeeds in performing service transfer is determined. For example, if the service transfer timer is 10 s, and if the UE can complete the entire service transfer process within 10 seconds, it is determined that service transfer succeeds this time; and otherwise, once the service transfer timer times out, it is determined that service transfer fails this time. In addition, the UE may receive a time threshold that is of service transfer and sent by the 3GPP access point, where the time threshold may be included in the first information, be included in the second information, or be included in a new message, and the time threshold is used, in the service transfer timer, by the UE to determine whether service transfer succeeds or service transfer fails. Alternatively, a WLAN access point search timer that is used to determine whether searching for a target WLAN succeeds may further be configured in the UE. For example, if the WLAN access point search timer is 5 s, and if the UE can find, within 5 s, a WLAN that conforms to the first information, it is identified that searching for a WLAN succeeds; and otherwise, once the WLAN access point search timer times out, it is determined that searching for a WLAN fails this time. In addition, the UE may receive a time threshold that is of searching for a WLAN and sent by the 3GPP access point, where the time threshold may be included in the first information, be included in the second information, or be included in a new message, and the time threshold is used, in the WLAN access point search timer, by the UE to determine whether searching for a WLAN succeeds.

When selecting a target WLAN by the UE times out, and if service transfer fails because searching for a target WLAN access point fails, the service transfer result may further include signal quality of the 3GPP access point and/or signal quality of the target WLAN access point that are/is detected by the UE.

Further, to report, to the 3GPP access point, that performing service transfer by the UE according to which type of policy succeeds or that service transfer fails because of which type of policy, the service transfer result may further include a service transfer policy.

When the first information is information that is sent by a 3GPP network and that is used to instruct the UE to perform service transfer to a WLAN access point, the service transfer policy is: performing service transfer according to the first information; or when the first information is information that is sent by a 3GPP network and that is used to instruct the UE to perform service transfer to a wireless local area network WLAN access point, and the preference setting of the UE, the service transfer policy is: performing, by the UE, service transfer according to either the information that is sent by the 3GPP network and that is used to instruct the UE to perform service transfer to a wireless local area network WLAN access point, or the preference setting of the UE.

For example, if a target WLAN access point cannot be determined according to the first information, the service transfer policy can indicate a reason why the target WLAN access point is not selected. For example, the reason may include: 1. There is no WLAN access point that conforms to the information that is sent by the 3GPP network and that is used to instruct the UE to perform service transfer to a wireless local area network WLAN access point; 2. There is no WLAN access point that conforms to the preference setting of the UE.

It should be noted that in the beginning, the UE is connected to at least one 3GPP access point (for example, this may be implemented by using a carrier aggregation technology), and the UE may further be connected to one or more WLAN access points at the same time, where the 3GPP access point may control resource scheduling of the WLAN access points. Therefore, so-called service transfer in the present invention means that some or all services of the UE are transferred from one or more 3GPP access points and WLAN access points to another or multiple WLAN access points, or service transfer means that some or all services of the UE are transferred from one or more 3GPP access points to one or more WLAN access points.

After the UE sends the service transfer result to the 3GPP access point that serves the UE, the 3GPP access point processes the service transfer result.

Specifically, after receiving the service transfer result, the 3GPP access point optimizes, according to the service transfer result, the information that is used to instruct the UE to perform service transfer to a WLAN access point, and an optimization process is specifically described in the following embodiments.

It may be learned from the above that in the prior art, a policy used by a 3GPP network side to assist or control a UE to select a WLAN access point is inappropriate, or a UE selects a WLAN access point according to another policy, and therefore, the UE cannot make full use of network system resources. In addition, the 3GPP network side cannot acquire causes of the problems, and thereby cannot optimize first information. According to the service transfer method provided in the first embodiment, a UE can report a service transfer result to a 3GPP access point that serves the UE, and the service transfer result helps the 3GPP access point optimize first information that is used to instruct the UE to perform service transfer to a WLAN access point. It is more applicable to use the optimized first information to instruct the UE to perform service transfer to a WLAN access point, and therefore, an effect of improving utilization of network system resources can be achieved.

Figure 2:
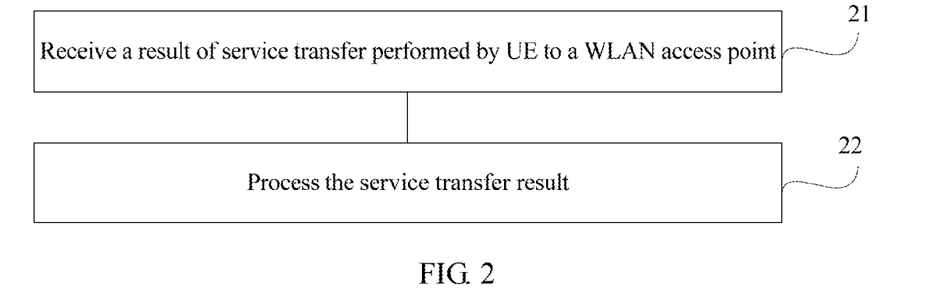
FIG. 2 is a flowchart of a service transfer processing method according to a second embodiment of the present invention.

FIG. 2 is a flowchart of a service transfer processing method according to a second embodiment of the present invention. The method provided in the second embodiment of the present invention may be implemented by a 3GPP access point. The second embodiment is specifically applied to a scenario in which the 3GPP access point controls or assists a UE in transferring a service from the 3GPP access point or a WLAN access point to another WLAN access point. As shown in FIG. 2, the service transfer processing method provided in the second embodiment of the present invention includes:

Step 21: Receive a result of service transfer performed by a UE to a WLAN access point.

In the beginning, a 3GPP access point that serves the UE may send second information to the UE by using an RRC message, so as to notify the UE of a service transfer result that needs to be acquired in a process of performing service transfer to a WLAN access point.

Specifically, the service transfer result may include that service transfer succeeds or service transfer fails.

When service transfer fails, the service transfer result may further include a cause of service transfer failure.

For the service transfer result, refer to specific descriptions in step 12, and details are not described herein again.

Step 22: Process the service transfer result.

After the service transfer result reported by the UE is received, that the 3GPP access point processes the service transfer result includes when the failure cause is that the UE fails to select a target WLAN access point, the 3GPP access point stops selecting the UE to perform service transfer. Alternatively, when the failure cause is that load of a target WLAN access point is higher than a preset value, that channel contention fails when a target WLAN access point is being accessed, that backhaul load of a target WLAN access point is higher than a preset value, or that a service port is disabled when the UE performs service transfer, the 3GPP access point stops selecting the target WLAN access point as a WLAN access point to which the UE performs service transfer. Alternatively, when the failure cause is that signal quality of the 3GPP access point is higher than a preset threshold, the 3GPP access point increases the preset threshold.

The following several examples describe how the 3GPP access point processes the service transfer result.

If the 3GPP access point learns, according to the service transfer result, that the UE fails to perform service transfer, first, if the failure cause is that a service transfer timer times out or a WLAN access point search timer times out when the UE searches for a WLAN access point, and the UE reports that signal quality of the 3GPP access point when the service transfer timer times out is higher than a signal quality threshold that is of the 3GPP access point and sent by the 3GPP access point, for example, at least 2 dB higher than the threshold, the 3GPP access point may increase the threshold, for example, increase the threshold by 2 dB. Second, if the failure cause is that a service transfer timer times out or a WLAN access point search timer times out when the UE searches for a WLAN access point, and the UE reports that signal quality of the WLAN access point when the service transfer timer times out is lower than a signal quality threshold that is of the WLAN access point and sent by the 3GPP access point, for example, at least 2 dB lower than the threshold, the 3GPP access point may decrease the threshold, for example, decrease the threshold by 2 dB. Third, if the cause of service transfer failure reported by the UE when performing service transfer is that load of a target WLAN access point is extremely heavy (higher than a preset value), the 3GPP access point lowers an access priority of the target WLAN access point, or deletes the target WLAN access point from a list of candidate WLANs, that is, does not send, to the UE, information that is used to perform service transfer to the target WLAN access point.

If the 3GPP access point learns, according to the service transfer result, that the UE succeeds in performing service transfer, for service information that is of a service transferred to a target WLAN access point and included in the service transfer result, the 3GPP access point may optimize a corresponding service transfer parameter according to the service information, so as to control the UE to preferentially assign, when the UE re-enables the same service subsequently, the service to an access point similar to the target WLAN access point. For example, by means of service transfer, the UE successfully transfers a service A that consumes large traffic from a 3GPP network to a WLAN. Then if re-enabling the service A subsequently, the UE may directly select the WLAN to serve the service A, but not select the 3GPP network to serve the service A.

It should be noted that although it is mentioned above that when a value such as the signal quality of the 3GPP access point or the signal quality of the target WLAN access point is greater or less than a threshold, the corresponding threshold is adjusted, in practical application, a more complex optimization algorithm may be used, for example, a weighted value is used.

In addition, the service transfer result may further include a service transfer policy, where the service transfer policy is used to indicate a manner used by the UE to determine a target WLAN access point.

It may be learned from the above that in the prior art, a policy used by a 3GPP network side to assist or control a UE to select a WLAN access point is inappropriate, or a UE selects a WLAN access point according to another policy, and therefore, the UE cannot make full use of network system resources. According to the service transfer processing method provided in the second embodiment, a 3GPP access point can receive and process a service transfer result reported by a UE, and thereby optimize first information that is used to instruct the UE to perform service transfer to a WLAN access point. It is more applicable to use the optimized first information to instruct the UE to perform service transfer to a WLAN access point, and therefore, an effect of improving utilization of network system resources can be achieved.

Figure 3:
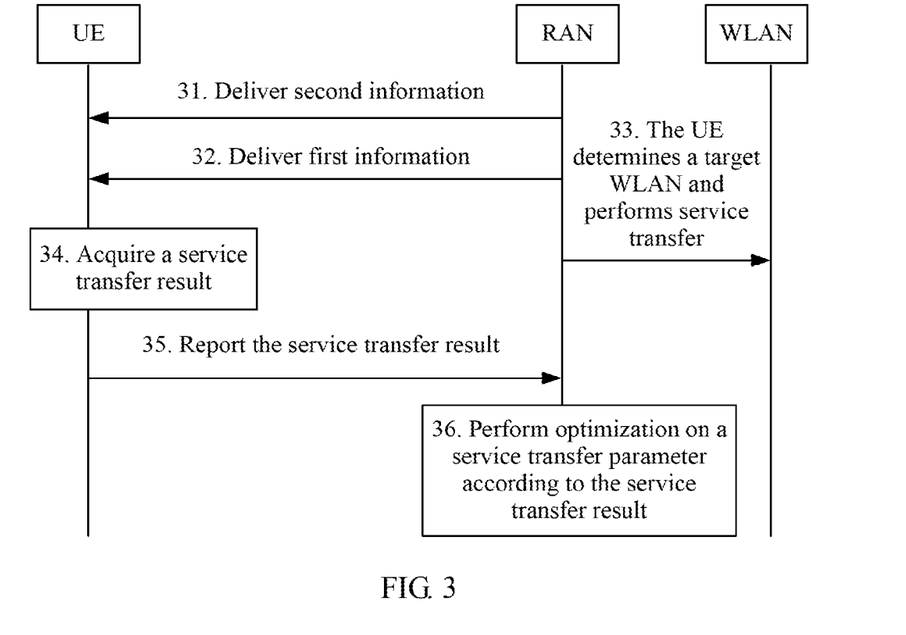
FIG. 3 is a flowchart of a service transfer method according to a third embodiment of the present invention.
Figure 4:
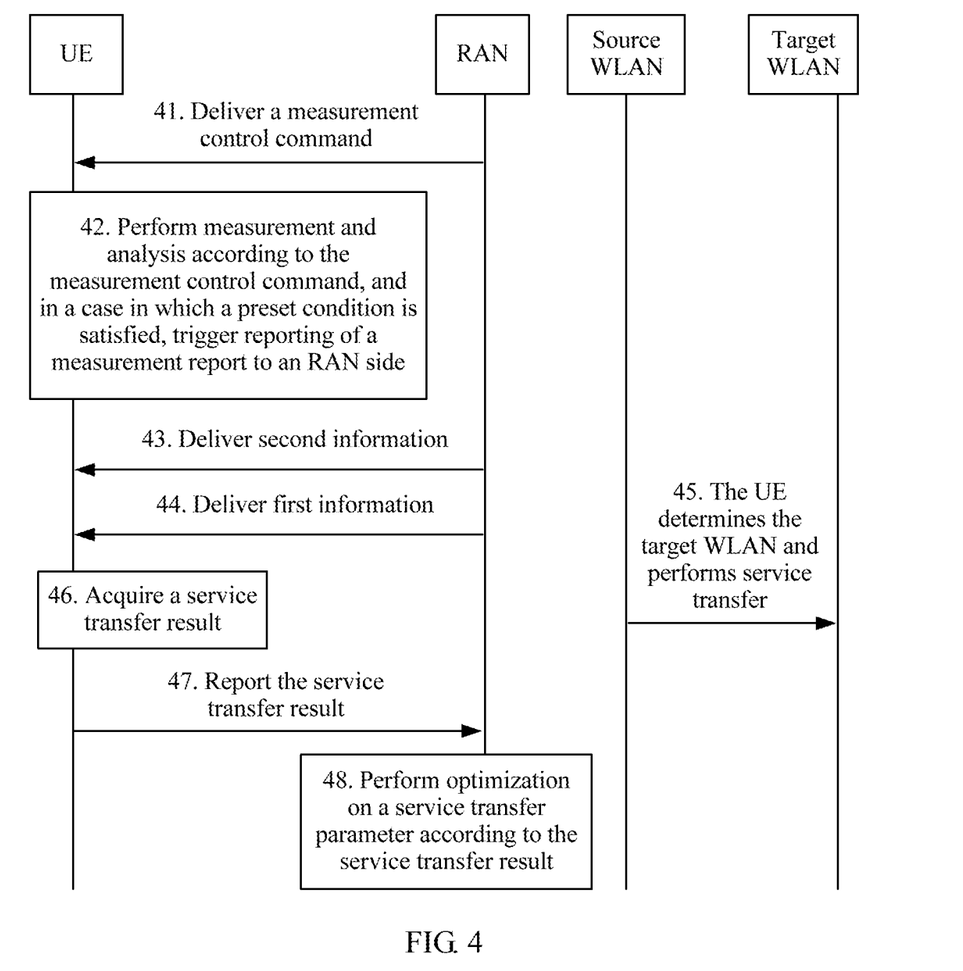
FIG. 4 is a flowchart of a service transfer method according to a fourth embodiment of the present invention.

FIG. 3 and FIG. 4 are respectively flowcharts of service transfer methods according to a third embodiment and a fourth embodiment of the present invention. In the third embodiment, that first information is information that is sent by a 3GPP access point and that is used to instruct a UE to perform service transfer to a WLAN access point is used as an example, and the UE performs service transfer from the 3GPP access point to the WLAN access point according to the information. In the fourth embodiment, that first information is information that is sent by a 3GPP access point and that is used to instruct a UE to perform service transfer to a WLAN access point is used as an example, and the UE performs service transfer from a source WLAN access point to a target WLAN access point according to the information. The source WLAN access point is a WLAN access point that currently provides a service for the UE. The target WLAN access point is a WLAN access point to which the UE performs service transfer. After service transfer succeeds, the target WLAN access point provides a service for the UE, or the source WLAN access point and the target WLAN access point provide a service for the UE at the same time.

In the third embodiment and the fourth embodiment, the 3GPP access point may be an evolved NodeB/radio network controller (eNB/RNC), or may be a combination of an eNB/RNC and a single radio controller (Single Radio Controller, SRC). The SRC and the eNB/RNC may communicate with each other, and the SRC is configured to perform resource scheduling for the eNB/RNC. If a network standard of the UE is a Long Term Evolution (LTE) network, a terrestrial interface between the SRC and a mobility management entity (MME) is an S1 interface of the LTE network standard, and there may be a direct interface between the SRC and the UE, or message forwarding may be performed by using the eNB/RNC. When the 3GPP access point is the combination of the eNB/RNC and the SRC, for a downlink message, the SRC receives a message from a last network node such as an MME or a serving gateway (S-GW), and sends the message to the eNB/RNC; and for an uplink message, the eNB/RNC sends a message received from the UE to the SRC. The following uses the LTE network as an example for description.

In the third embodiment and the fourth embodiment, the UE accesses a radio access network (RAN). An access network entity that provides communications coverage for the RAN is corresponding to the 3GPP access point in the first embodiment and the second embodiment, and an access network entity that provides communications coverage for a WLAN is corresponding to a target WLAN access point. For ease and convenience, the RAN and the access network entity that provide communications coverage for the RAN may be collectively referred to as an RAN, the WLAN and the access network entity that provide communications coverage for the WLAN may be collectively referred to as a WLAN, and persons skilled in the art determine a specific meaning of the RAN or the WLAN according to a context used by the RAN or the WLAN.

As shown in FIG. 3, the service transfer method provided in the third embodiment of the present invention includes:

Step 31: An RAN side sends second information to a UE by using an RRC message.

When implementation of this embodiment starts, the UE has established a connection relationship with an RAN entity (that is, an eNB/RNC, or a combination of an eNB/RNC and an SRC). In this step, over an air interface between the RAN and the UE, the RAN sends the second information to the UE by using the RRC message. The second information may instruct the UE to record a service transfer result, for example, instruct the UE to record information about a service transfer success and information about a service transfer failure. For detailed descriptions, refer to the first embodiment. As described in the first embodiment, the second information may not be sent by the RAN to the UE, but may be preconfigured in the UE. In this embodiment, that the second information is sent by the RAN to the UE is used as an example for description.

Step 32: The RAN side sends first information to the UE.

In this step, the first information is determined by the RAN according to a preset service transfer parameter. The service transfer parameter may include a signal quality threshold of a 3GPP access point, a signal quality threshold of a WLAN access point, and the like.

It should be noted that the first information in step 32 may be sent to the UE together with the second information in step 31, or may be sent before step 31.

Step 33: The UE determines a target WLAN and performs service transfer.

The UE may determine, in the following manners, the target WLAN for service transfer. It may be understood that the following listed manners are merely examples, and persons skilled in the art may use another manner to determine the target WLAN.

Manner 1: The first information received by the UE includes the signal quality threshold of the WLAN access point. If the UE determines that signal quality of a found WLAN is higher than the signal quality threshold of the WLAN access point, the UE may trigger service transfer to the WLAN. Further, the first information may further include the signal quality threshold of the 3GPP access point. If the UE determines that signal quality of a 3GPP access point that is currently accessed is lower than the signal quality threshold of the 3GPP access point, and the signal quality of the found WLAN is higher than the signal quality threshold of the WLAN access point, the UE may trigger service transfer to the WLAN. The UE may learn signal quality of a neighboring WLAN by means of measurement.

Manner 2: The first information received by the UE includes multiple WLAN IDs (WLAN identity) to which the UE can perform service transfer, for example, WLAN service set identifiers (SSID), or basic service set identifiers (BSSID), or extended service set identifiers (ESSID). The UE may measure signal quality of WLANs corresponding to the multiple WLAN IDs, and select, as the target WLAN from the WLANs, a WLAN of which a signal satisfies a preset condition (for example, signal quality is the best). Certainly, the first information may also include only one WLAN ID.

Manner 3: On the basis of the foregoing manner 1 or manner 2, that is, after determining one or more WLANs in manner 1 or manner 2, the UE may further determine the target WLAN with reference to other information, for example, with reference to ANDSF policy information. If a WLAN determined in manner 1 or manner 2 is the same as a WLAN determined according to the ANDSF policy information, the UE may transfer a service to the same one or more WLANs; if a WLAN determined in manner 1 or manner 2 is different from a WLAN determined according to the ANDSF policy information, the UE may randomly select or determine, according to another parameter, a WLAN of which signal quality is the best, so as to perform service transfer, or the UE does not perform service transfer anymore. The another parameter may include preference setting (user preference) of the UE, for example, if there exist a public WLAN and a home WLAN, the preference setting of the UE is that a priority of accessing home Wi-Fi is higher than a priority of accessing public Wi-Fi.

It should be noted that a manner in which the UE acquires the ANDSF policy information from an ANDSF server, and the UE determines the target WLAN according to the ANDSF policy information is the same as that of the prior art.

After determining the target WLAN, the UE may attempt to connect to the target WLAN and perform channel contention, and if the connection succeeds and channel contention succeeds, the UE transfers a service to the target WLAN. On the other hand, the UE may be unable to access the target WLAN or may not successfully contend for a channel, and the UE fails to transfer a service.

Step 34: The UE acquires a service transfer result.

Regardless of whether service transfer succeeds or service transfer fails, the UE may acquire the service transfer result according to configuration information of the second information received in step 31. For acquiring of the service transfer result, refer to specific descriptions in the first embodiment.

Step 35: The UE reports the service transfer result to the RAN side.

The UE may report the service transfer result by using an RRC message. Corresponding to the first embodiment, the service transfer result may further include a service transfer policy, which is used to indicate that the target WLAN selected by the UE is selected in which manner (including manner 1, manner 2, and manner 3 in step 33, or another manner), for example, according to the preference setting of the UE, or information sent by the 3GPP access point, or an ANDSF policy.

Step 36: The RAN side performs optimization on a service transfer parameter according to the service transfer result reported by the UE.

If the UE reports the service transfer policy at the same time, if indication information of the service transfer policy indicates that the UE determines the target WLAN according to the first information sent by the 3GPP access point, the RAN side optimizes the service transfer parameter according to the service transfer result reported by the UE. For an optimization manner, refer to specific descriptions in the second embodiment.

It may be learned from the above that according to the service transfer method provided in the third embodiment, a UE can report a service transfer result to an RAN that serves the UE, and the service transfer result helps the RAN optimize first information that is used to instruct the UE to perform service transfer from the RAN to a target WLAN. It is more applicable to use the optimized first information to instruct the UE to perform service transfer to a target WLAN, and therefore, an effect of improving utilization of network system resources can be achieved.

In the fourth embodiment, an RAN controls a UE to perform service transfer from a source WLAN to a target WLAN. As shown in FIG. 4, the service transfer method provided in the fourth embodiment of the present invention includes:

Step 41: An RAN side sends a measurement control command to a UE.

In this step, the RAN side may send the measurement control command to the UE by using an RRC message. The measurement control command is used to configure the UE to perform measurement on a source WLAN and a target WLAN. The source WLAN is a WLAN that currently provides a service for the UE, and the target WLAN is a WLAN to which the UE may perform service transfer.

Step 42: The UE performs measurement and analysis according to the measurement control command, and if a preset condition is satisfied, triggers reporting of a measurement report to the RAN side.

The UE may measure signal quality of the target WLAN, or measure signal quality of the source WLAN and signal quality of the target WLAN at the same time.

The UE may trigger, if any one of the following conditions is satisfied, reporting of the measurement report to the RAN side:

Condition 1: The signal quality of the target WLAN is higher than a preset threshold.

Condition 2: The signal quality of the target WLAN is higher than a preset threshold, and the signal quality of the source WLAN is lower than another preset threshold.

Step 43: The RAN side sends second information to the UE.

For step 43, refer to descriptions in the foregoing embodiment. Step 43 may be performed before step 41, or may be performed after step 41. If step 43 is performed after step 41, step 43 and step 44 may also be performed at the same time, that is, the RAN side may send the second information in step 43 and first information in step 44 to the UE at the same time.

Step 44: The RAN side sends first information to the UE.

Step 45: The UE determines a target WLAN according to the first information and performs service transfer from a source WLAN to the target WLAN.

In this step, different from the third embodiment in which it is required to determine whether a WLAN corresponding to a WLAN ID included in the first information satisfies a preset condition (for example, whether signal quality of the target WLAN is higher than a preset value), the UE may directly determine the target WLAN according to a WLAN ID included in the first information received in step 44, and attempt to connect to the target WLAN.

Certainly, similar to the third embodiment, the UE may also determine the target WLAN with reference to user preference of the UE and/or ANDSF policy information sent by an ANDSF server, and referring to the third embodiment, a specific determining manner may be similarly obtained.

Step 46: The UE acquires a service transfer result.

Step 47: The UE reports the service transfer result to the RAN side.

Similar to the third embodiment, the reported service transfer result may further include a service transfer policy.

Step 48: The RAN performs optimization on a service transfer parameter according to the service transfer result reported by the UE.

It may be learned from the above that according to the service transfer method provided in the fourth embodiment, a UE can report a service transfer result to an RAN that serves the UE, and the service transfer result helps the RAN optimize first information that is used to instruct the UE to perform service transfer from a source WLAN to a target WLAN. It is more applicable to use the optimized first information to instruct the UE to perform service transfer to a target WLAN access point, and therefore, an effect of improving utilization of network system resources by the UE can be achieved.

Corresponding to the service transfer method provided in the foregoing first embodiment of the present invention, a fifth embodiment of the present invention further provides a service transfer apparatus, where the apparatus may be specifically a cellular phone, a PDA, a wireless modem, a handheld device, a laptop computer, a cordless phone, or the like.

Figure 5:
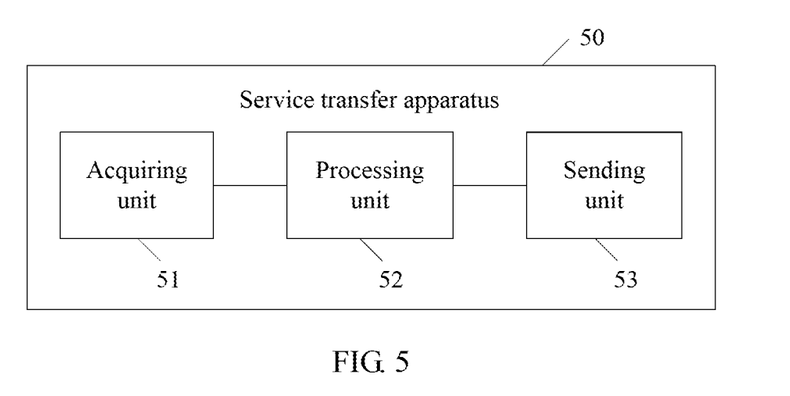
FIG. 5 is a schematic structural diagram of a service transfer apparatus according to a fifth embodiment of the present invention.

As shown in FIG. 5, a service transfer apparatus 50 provided in the fifth embodiment of the present invention includes: an acquiring unit 51, configured to acquire first information that is used to instruct the apparatus 50 to perform service transfer to a WLAN access point. A processing unit 52 is configured to perform service transfer according to the first information acquired by the acquiring unit 51. A sending unit 53 is configured to send a service transfer result to a 3GPP access point that serves the apparatus 50.

The first information that is acquired by the acquiring unit 51 and used to instruct the apparatus 50 to perform service transfer to a WLAN access point includes information that is sent by a 3GPP network and that is used to instruct the apparatus 50 to perform service transfer to a WLAN access point; or includes information that is sent by a 3GPP network and that is used to instruct the apparatus 50 to perform service transfer to a WLAN access point, and a preference setting of the apparatus 50. The 3GPP network side includes the 3GPP access point, or includes both the 3GPP access point and an ANDSF server.

Specifically, the service transfer result includes that service transfer succeeds or service transfer fails.

When performing service transfer by the apparatus 50 succeeds, the service transfer result acquired by the processing unit 52 may further include: an identity of a target WLAN access point that is selected by the processing unit 52, or service information of a service that is transferred to a target WLAN access point, or signal quality of the 3GPP access point and signal quality of a target WLAN access point when the processing unit 52 selects the target WLAN access point.

When performing service transfer by the apparatus 50 fails, the service transfer result acquired by the processing unit 52 further includes a cause of service transfer failure. The cause of service transfer failure may include that the processing unit 52 fails to select a target WLAN access point, that load of the target WLAN access point is higher than a preset value, that channel contention fails when the target WLAN access point is being accessed, that backhaul load of the target WLAN access point is higher than a preset value, that a service port is disabled when the processing unit 52 performs service transfer, and that signal quality of the 3GPP access point is higher than a preset threshold.

The acquiring unit 51 is further configured to receive a time threshold that is of service transfer and sent by the 3GPP access point, where the time threshold is used by the apparatus 50 to determine whether service transfer succeeds or service transfer fails.

Further, the service transfer result further includes signal quality of the 3GPP access point and signal quality of a target WLAN access point when selecting the target WLAN by the processing unit 52 times out.

In addition, the service transfer result further includes a service transfer policy, where when the first information is the information that is sent by the 3GPP network and that is used to instruct the apparatus 50 to perform service transfer to a WLAN access point, the service transfer policy is: performing service transfer according to the first information; or when the first information is the information that is sent by the 3GPP network and that is used to instruct the apparatus 50 to perform service transfer to a wireless local area network WLAN access point, and the preference setting of the apparatus 50, the service transfer policy is: performing, by the apparatus 50, service transfer according to either the information that is sent by the 3GPP network and that is used to instruct the apparatus 50 to perform service transfer to a wireless local area network WLAN access point, or the preference setting of the apparatus 50.

Specifically, to acquire the service transfer result, the acquiring unit 51 may be further configured to: receive second information sent by the 3GPP access point, where the second information is used to instruct the apparatus 50 to record the service transfer result; or acquire second information preset in the apparatus 50.

It may be learned from the above that in the prior art, a policy used by a 3GPP network side to assist or control a UE to select a WLAN access point is inappropriate, or a UE selects a WLAN access point according to another policy, and therefore, the UE cannot make full use of network system resources. According to the service transfer apparatus provided by the present invention, a UE can report a service transfer result to a 3GPP access point, and the service transfer result helps the 3GPP access point optimize first information that is used to instruct the UE to perform service transfer to a WLAN access point. It is more applicable to use the optimized first information to instruct the UE to perform service transfer to a WLAN access point, and therefore, an effect of improving utilization of network system resources can be achieved.

Corresponding to the service transfer processing method provided in the foregoing second embodiment of the present invention, a sixth embodiment of the present invention further provides a service transfer processing apparatus, where the service transfer processing apparatus may be specifically a 3GPP access point, for example, a NodeB or an evolved NodeB (eNB).

Figure 6:
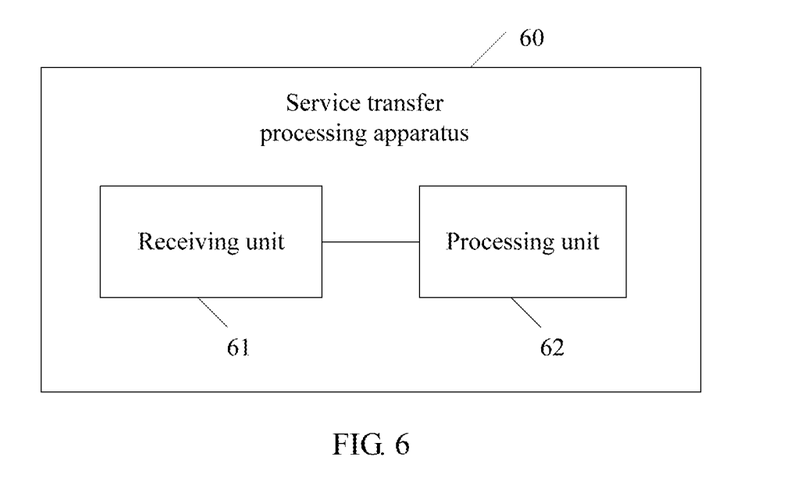
FIG. 6 is a schematic structural diagram of a service transfer processing apparatus according to a sixth embodiment of the present invention.

As shown in FIG. 6, a service transfer processing apparatus 60 provided in the sixth embodiment of the present invention includes a receiving unit 61, configured to receive a result of service transfer performed by a UE to a WLAN access point. A processing unit 62 is configured to process the service transfer result.

Specifically, the service transfer result received by the receiving unit 61 includes that service transfer succeeds or service transfer fails.

When service transfer fails, the service transfer result further includes a cause of service transfer failure. For details, refer to the foregoing embodiment.

Processing the service transfer result by the processing unit 62 is specifically: when the failure cause is that the UE fails to select a target WLAN access point, stopping selecting the UE to perform service transfer; or when the failure cause is that load of a target WLAN access point is higher than a preset value, that channel contention fails when a target WLAN access point is being accessed, that backhaul load of a target WLAN access point is higher than a preset value, or that a service port is disabled when the UE performs service transfer, stopping selecting the target WLAN access point as a WLAN access point to which the UE performs service transfer; or when the failure cause is that signal quality of a 3GPP access point is higher than a preset threshold, increasing the preset threshold.

It may be learned from the above that in the prior art, a policy used by a 3GPP network side to assist or control a UE to select a WLAN access point is inappropriate, or a UE selects a WLAN access point according to another policy, and therefore, the UE cannot make full use of network system resources. According to the service transfer processing apparatus provided in the sixth embodiment, a service transfer result reported by a UE can be received and processed, and thereby first information that is used to instruct the UE to perform service transfer to a WLAN access point is optimized. It is more applicable to use the optimized first information to instruct the UE to perform service transfer to a WLAN access point, and therefore, an effect of improving utilization of network system resources by the UE can be achieved.

Figure 7:
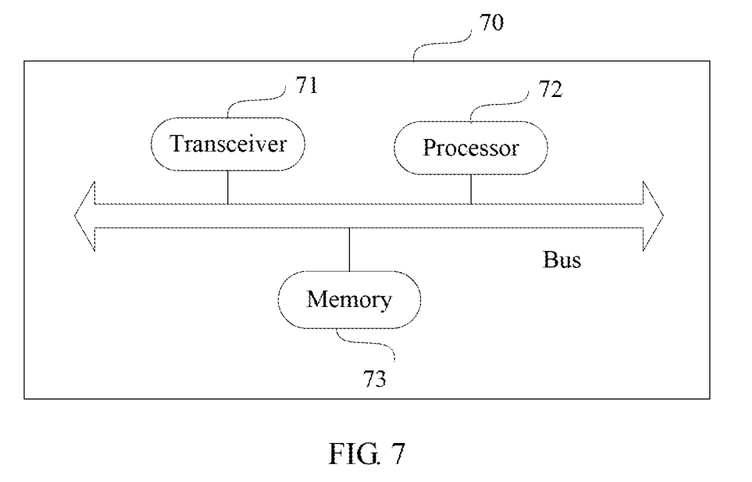
FIG. 7 is a schematic structural diagram of an electronic device according to a seventh embodiment of the present invention.

FIG. 7 is a schematic structural diagram of an electronic device according to a seventh embodiment of the present invention. As shown in FIG. 7, an electronic device 70 of this embodiment includes at least one transceiver 71, a processor 72, a memory 73, and a bus. The transceiver 71, the processor 72, and the memory 73 are connected and complete mutual communication by using the bus. The bus may be an Industry Standard Architecture (ISA for short) bus, a peripheral component interconnect (PCI for short) bus, an Extended Industry Standard Architecture (EISA for short) bus, or the like. The bus may include an address bus, a data bus, a control bus, and the like. For ease of denotation, only one bold line is used in FIG. 7 to indicate the bus; however, this does not indicate that there is only one bus or only one type of buses.

The transceiver 71 is configured to acquire first information that is used to instruct the electronic device 70 to perform service transfer to a wireless local area network WLAN access point.

The processor 72 is configured to perform service transfer according to the first information acquired by the transceiver 71.

The transceiver 71 is further configured to send a service transfer result to a 3GPP access point that serves the electronic device 70.

Specifically, the first information is information that is sent by a 3GPP network and that is used to instruct the electronic device 70 to perform service transfer to a WLAN access point; or the first information is information that is sent by a 3GPP network and that is used to instruct the electronic device 70 to perform service transfer to a WLAN access point, and a preference setting of the electronic device 70.

The service transfer result may further include that service transfer succeeds or service transfer fails. The transceiver 71 is further configured to receive a time threshold that is of service transfer and sent by the 3GPP access point, where the time threshold is used by the electronic device 70 to determine whether service transfer succeeds or service transfer fails.

When performing service transfer by the electronic device 70 fails, the service transfer result acquired by the processor 72 further includes a cause of service transfer failure. When performing service transfer by the electronic device 70 succeeds, the service transfer result acquired by the processor 72 further includes information such as an identity of a target WLAN access point that is selected by the processor 72. For details, refer to the foregoing embodiments, and details are not described herein again.

In addition, the service transfer result further includes selection policy indication information of a WLAN access point. For details, refer to the foregoing embodiments, and details are not described herein again.

The service transfer result further includes signal quality of the 3GPP access point and signal quality of a target WLAN access point when selecting the target WLAN by the processor 72 times out.

In addition, to acquire the service transfer result, the transceiver 71 is further configured to: receive second information sent by the 3GPP access point, where the second information is used to instruct the processor 72 to record the service transfer result; or acquire second information preset in the electronic device 70.

The transceiver 71 is mainly configured to implement communication between the electronic device 70 of this embodiment and another device or apparatus (such as the 3GPP access point). The processor 72 may be a central processing unit (CPU for short), or an application-specific integrated circuit (ASIC for short), or one or more integrated circuits configured to implement this embodiment of the present invention.

It may be learned from the above that in the prior art, a policy used by a 3GPP network side to assist or control an electronic device to select a WLAN access point is inappropriate, or an electronic device selects a WLAN access point according to another policy, and therefore, the electronic device cannot make full use of network system resources. According to the electronic device provided by the present invention, a service transfer result can be reported to a 3GPP access point, and the service transfer result helps the 3GPP access point optimize first information that is used to instruct an electronic device to perform service transfer to a WLAN access point. It is more applicable to use the optimized first information to instruct the electronic device to perform service transfer to a WLAN access point, and therefore, an effect of improving utilization of network system resources can be achieved.

Figure 8:
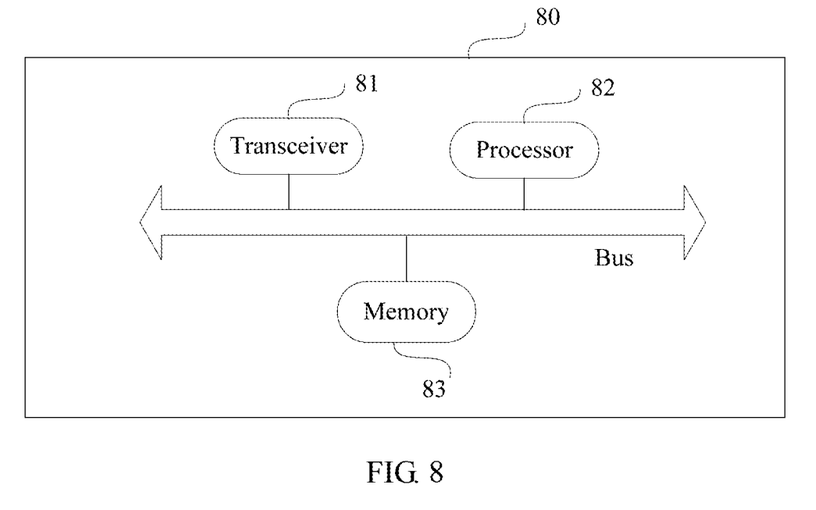
FIG. 8 is a schematic structural diagram of an access point according to an eighth embodiment of the present invention

FIG. 8 is a schematic structural diagram of an access point according to an eighth embodiment of the present invention. As shown in FIG. 8, an access point 80 of this embodiment includes at least one transceiver 81, a processor 82, a memory 83, and a bus. The transceiver 81, the processor 82, and the memory 83 are connected and complete mutual communication by using the bus. The bus may be an ISA bus, a PCI bus, an EISA bus, or the like. The bus may include an address bus, a data bus, a control bus, and the like. For ease of denotation, only one bold line is used in FIG. 8 to indicate the bus; however, this does not indicate that there is only one bus or only one type of buses.

The transceiver 81 is configured to receive a result of service transfer performed by a UE to a WLAN access point.

The processor 82 is configured to process the service transfer result.

Specifically, the service transfer result is that service transfer succeeds or service transfer fails.

When service transfer fails, the service transfer result further includes a cause of service transfer failure.

The processor 82 is specifically configured to: when the failure cause is that the UE fails to select a target WLAN access point, stop selecting the UE to perform service transfer; or when the failure cause is that load of a target WLAN access point is higher than a preset value, that channel contention fails when a target WLAN access point is being accessed, that backhaul load of a target WLAN access point is higher than a preset value, or that a service port is disabled when the UE performs service transfer, stop selecting the target WLAN access point as a WLAN access point to which the UE performs service transfer; or when the failure cause is that signal quality of the access point 80 is higher than a preset threshold, increase the preset threshold.

For details, refer to the foregoing embodiments, and details are not described herein again.

It may be learned from the above that in the prior art, a policy used by a 3GPP network side to assist or control a UE to select a WLAN access point is inappropriate, or a UE selects a WLAN access point according to another policy, and therefore, the UE cannot make full use of network system resources. According to the access point provided in the eighth embodiment, the access point can receive and process a service transfer result reported by a UE, and thereby optimize first information that is used to instruct the UE to perform service transfer to a WLAN access point. It is more applicable to use the optimized first information to instruct the UE to perform service transfer to a WLAN access point, and therefore, an effect of improving utilization of network system resources by the UE can be achieved.

The embodiments in this specification are all described with focuses, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present invention, connection relationships between the modules indicate that the modules have communication connections with each other, which may be specifically implemented as one or more communications buses or signal cables. Persons of ordinary skill in the art may understand and implement the embodiments of the present invention without creative efforts.

Persons of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

What is claimed is:

1. An user equipment (UE) comprising:
a transceiver configured to acquire first information that is used to instruct the UE to perform service transfer to a wireless local area network (WLAN) access point;
a processor;
a memory storing a program to be executed in the processor, the program comprising instructions that cause the processor to perform service transfer to a target WLAN access point according to the first information acquired by the transceiver; and
the transceiver is further configured to send information of service transfer status to a 3rd Generation Partnership Project (3GPP) access point that serves the UE,
wherein the information of service transfer status comprises an indication that indicates successful service transfer to the target WLAN access point or an indication that indicates failed service transfer to the target WLAN access point.

2. The UE according to claim 1, wherein:
the first information is information that is acquired from a 3GPP network and that is used to instruct the UE to perform service transfer to a WLAN access point.

3. The UE according to claim 1, wherein in response to a successful service transfer, the instructions cause an identity of the target WLAN access point to be included in the information of service transfer status.

4. The UE according to claim 1, wherein in response to a failed service transfer, the instructions are configured to include a cause of service transfer failure in the information of the service transfer status.

5. The UE according to claim 4, wherein the cause of service transfer failure comprises that the UE fails to select the target WLAN access point.

6. The UE according to claim 1, wherein the first information acquired by the transceiver comprises a WLAN identity list, wherein the list comprises identities of one or more WLAN access points to which the UE is able to perform service transfer.

7. The UE according to claim 1, wherein the first information acquired by the transceiver comprises a time threshold of service transfer;
the program comprises further instructions that cause the processor to determine whether service transfer succeeds or service transfer fails according to the time threshold.

8. The UE according to claim 1, wherein the information of service transfer status is a result of the service transfer.

9. A service transfer method comprising:
acquiring, by a user equipment (UE), first information that is used to instruct the UE to perform service transfer to a wireless local area network (WLAN) access point; and
performing, by the UE, service transfer to a target WLAN access point according to the first information, sending, by the UE, information of service transfer status to a 3rd Generation Partnership Project (3GPP) access point that serves the UE, wherein the information of service transfer status comprises an indication that indicates successful service transfer to the target WLAN access point or an indication that indicates failed service transfer to the target WLAN access point.

10. The method according to claim 9, wherein:

the first information is information that is acquired from a 3GPP network and that is used to instruct the UE to perform service transfer to a WLAN access point.

11. The method according to claim 9, wherein in response to a successful service transfer, an identity of the target WLAN access point is included in the information of service transfer status.

12. The method according to claim 9, wherein in response to a faded service transfer, a cause of service transfer failure is included in the information of the service transfer status.

13. The method according to claim 12, wherein the cause of service transfer failure comprises that the UE fails to select the target WLAN access point.

14. The method according to claim 9, wherein the first information comprises a WLAN identity list, wherein the WLAN identity list comprises identities of one or more WLAN access points to which the UE is willing to perform service transfer.

15. The method according to claim 9, wherein the first information comprises a time threshold of service transfer, wherein the method further comprises:

determining, by the UE, whether service transfer succeeds or service transfer fails according to the time threshold.

16. The method according to claim 9, wherein the information of service transfer status is a result of the service transfer.

17. A non-transitory processor-readable medium comprising:

a processor;

a processor-executable instructions for a user equipment (UE), the processor-executable instructions, when executed by the processor, facilitating performance of the following:

acquiring first information that is used to instruct the UE to perform service transfer to a wireless local area network (WLAN) access point;

performing service transfer to a target WLAN access point according to the first information; and sending information of service transfer status to a 3rd Generation Partnership Project (3GPP) access point that serves the UE, wherein the information of service transfer status comprises an indication that indicates successful service transfer to the target WLAN access point or an indication that indicates failed service transfer to the target WLAN access point.

\* \* \* \* \*